No. 669,705. Patented Mar. 12, 1901.
R. REEH.
READING DEVICE FOR SURVEYING OR OTHER INSTRUMENTS.
(Application filed Nov. 1, 1899.)
(No Model.)
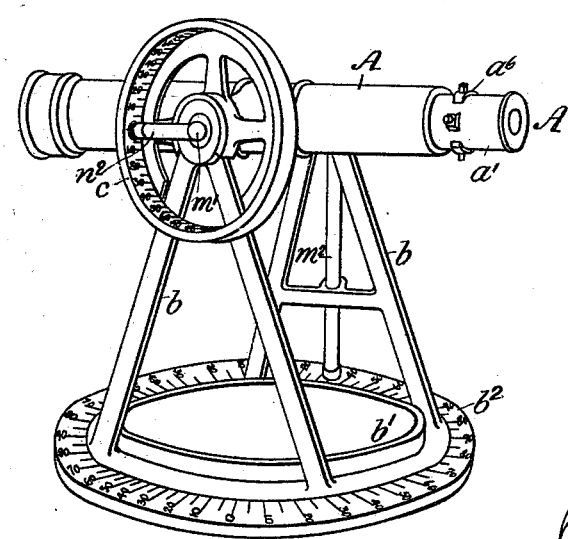
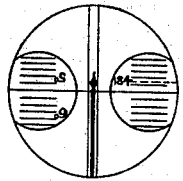
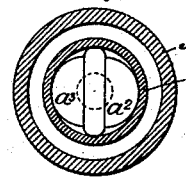
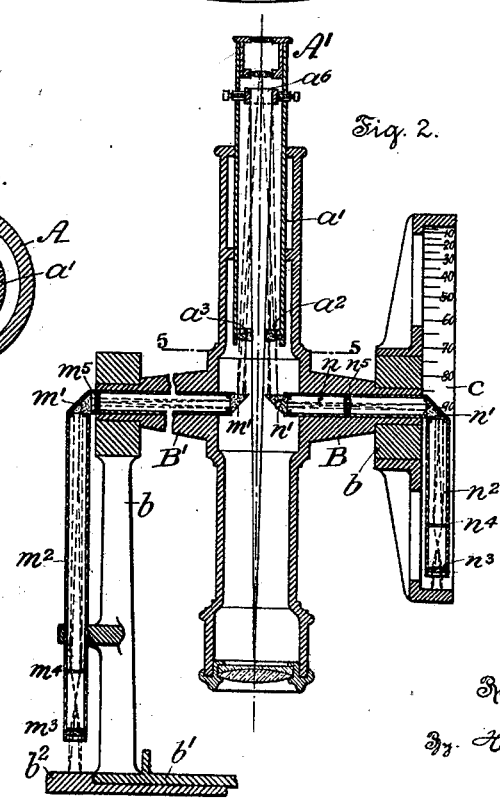
Witnesses:
St. W. Bormann
M. Bormann
Inventor:
Reinhard Reeh
By Hermann Bormann
Atty.
THE NORRIS PETERS CO., PHOTO-LITHO., WASHINGTON, D. C.

UNITED STATES PATENT OFFICE.

REINHARD REEH, OF WETZLAR, GERMANY.

READING DEVICE FOR SURVEYING OR OTHER INSTRUMENTS.

SPECIFICATION forming part of Letters Patent No. 669,705, dated March 12, 1901.

Application filed November 1, 1899. Serial No. 735,500. (No model.)

*To all whom it may concern:*

Be it known that I, REINHARD REEH, a subject of the Emperor of Germany, residing in the city of Wetzlar, Germany, have invented new and useful Improvements in Reading Devices for Surveying or other Instruments, of which the following is a specification.

My invention relates to surveying instruments, as theodolites, tachymeters, &c., and more particularly to the telescope, circles, and devices connected therewith for easy reading. It is very objectionable that after the instrument has been set the operator is obliged to either leave his position in order to read the instrument or to rotate the same until it is in position for the operator to read the indicated inclination to the horizontal. With my improved instrument the operator can set and read both circles of the instrument to ascertain the angles in the horizontal and vertical planes without leaving his position when focusing. With this end in view the instrument is provided with tubes and mirrors or glass prisms adapted to transmit the picture at the places of readings to the observer's or operator's eye in front of the telescope.

My invention will be more fully understood taken in connection with the accompanying drawings, forming part hereof, and in which—

Figure 1 is a perspective view of a surveying instrument, showing the telescope on trunnions, an auxiliary tube attached to each end of the hollow trunnions and extending toward the horizontal and vertical circles. Fig. 2 is a section through the telescope, showing the hollow trunnions, the vertical and horizontal reading circles, and the prisms for transmitting the picture of the circles to the operator's eye. Fig. 3 shows pictures of the reflected portions of the horizontal and vertical circles and the object focused as presented to the eye of the operator, who can read both inclinations without giving up his position at the telescope. Fig. 4 shows a similar view; and Fig. 5 is a cross-section through the telescope on the line 5 5 of Fig. 2, showing the arrangement of two half-lenses for concentrating the light-rays transmitted by the prisms in the hollow trunnions.

Referring now to the drawings for a further description of my invention, A is the telescope, provided with trunnions B and B, mounted on standards $b$ of a circular plate $b'$, which serves as the alidade of the horizontal circle $b^2$, supported, as usual, by a tripod. The vertical circle $c$ is adjustably secured to one of the standards $b$ and graduated, preferably on the inner edge, as shown in Figs. 1 and 2, for a purpose to be presently described. The trunnion B is hollow and provided with a tube $n$, having located therein at each end a glass prism $n'$. A tube $n^2$, communicating with the tube $n$, is secured to the trunnion B and extends radially outward therefrom, preferably in line with the axis of the telescope, so that the free extremity is in proximity to the graduated edge of the vertical circle $c$, which is adjustably secured to the standard $b$. At the free end of the tube $n^2$ is provided a collecting-lens $n^3$, and at a suitable distance therefrom a glass plate $n^4$, having engraved therein a scale. This scale is divided into units corresponding to the divisions of the circle $c$, and each unit is subdivided to serve as a vernier. The collecting-lens $n^3$ and scale $n^4$ constitute the objective of a microscope, which produces the real picture of the graduation of the circle $c$, but shows the division-numbers, &c., inverted. In order to transmit the picture so obtained to and through the telescope to the observer's eye, the prisms $n'$, as before mentioned, and the lens $n^5$ are provided in the tubes $n$ and $n^2$. In the telescope, at the inner end of the sliding tube $a'$, is secured a lens made in two sections $a^2$ and $a^3$ to concentrate and project the rays in the tubes $n$ and $n^2$ and their prisms, &c., to the objective of the telescope A. The sections $a^2$ and $a^3$ of the lens are mounted far enough apart—*i. e.*, from the center of the telescope-tube to each side, Fig. 5—to obtain a clear picture of the object to be observed through the telescope, while the lens-section $a^2$ reflects the rays from the prism $n'$ of the picture of the vertical circles through the cross-wire $a^6$ and the lenses of the telescope at its objective end A'. To observe or read the horizontal circles at the same time the vertical circles and the object are in view, similar tubes, prisms, and lenses are mounted on the fulcrum B' of the telescope. In other words, the picture of the horizontal circle $b^2$ is produced by the collecting-lens $m^3$ and subdivided by the scale $m^4$ of the tube $m^2$, which in this case is secured to the standard $b$ and revolves therewith, a lens $m^5$ is secured in the tube $m$, and the prisms $m'$ direct the rays from the lens $m^3$ and $m^4$ to the lens-section $a^3$, which concentrates and reflects the same through the cross-wire $a^6$ and the lenses of the telescope at its objective end A'. The distance of the scales $m^4$ and $n^4$ from the respective lenses $m^3$ and $n^3$ and the distance between the lenses $m^5$ $n^5$ and the prisms $n'$ $m'$ must be suited to the condition or kind of lenses to be employed. The lens-sections $a^2$ $a^3$ are each to be exactly a one-half disk and of such conformity as to convey the rays reflecting from the prisms $n'$ and $m'$ to the cross-wire $a^6$ and yet leave sufficient room to not interfere with the workings of the telescope to focus at the object.

It will be apparent to any one skilled in the art that modifications may be made without departing from the spirit of the invention. For instance, a tube on each of the trunnions B and B' may be provided to extend onto the horizontal circle, in which case, however, the tubes $n^2$, leading to the vertical circles, is to be abandoned and the two tubes $m^2$ reach onto the horizontal circles $b^2$. In such case the telescope will show a picture, as shown in Fig. 4, the graduations shown on the right-hand side being the picture of that part of the horizontal circle which is at the right-hand side of the telescope and showing the figures, &c., in their natural position, while the left-hand side of the telescope shows the figures inverted, the position of the cross-wire indicating the number of degrees, &c. Moreover, the mounting and framing of the circles and lenses may be varied to suit various requirements; but,

Having thus described the nature and objects of my invention, what I claim as new, and desire to secure by Letters Patent, is—

1. In a surveying instrument comprising a telescope mounted in trunnions a bore in each trunnion, a vertical and a horizontal circle in combination with tubes extending from the bore of the trunnion into close proximity with the said circles, lenses, prisms and scales in said tubes, a lens made in two sections and mounted in the telescope to contract and convey the rays from the said prisms to the lenses of the telescope, substantially as and for the purpose set forth.

2. In a surveying instrument comprising a telescope mounted in trunnions, a bore in each trunnion a vertical circle secured to a standard of the telescope a horizontal circle supporting the said telescope, tubes extending from the bores of the trunnions into close proximity of the said circles, lenses, prisms and scales in said tubes, a lens made in two sections and mounted in the telescope to contract and convey the rays from the said prisms to the lenses of the telescope, substantially as and for the purpose set forth.

In witness whereof I have hereunto set my hand in presence of two witnesses.

REINHARD REEH.

Witnesses:
ERNST FRANKS,
ADOLF REEH.